Feb. 2, 1960 R. H. BROWN 2,923,387
CLUTCH AND THROTTLE CONTROL MECHANISMS
Filed July 29, 1955 6 Sheets-Sheet 1

INVENTOR
R. H. BROWN
By Wilkinson & Mawhinney
ATTYS

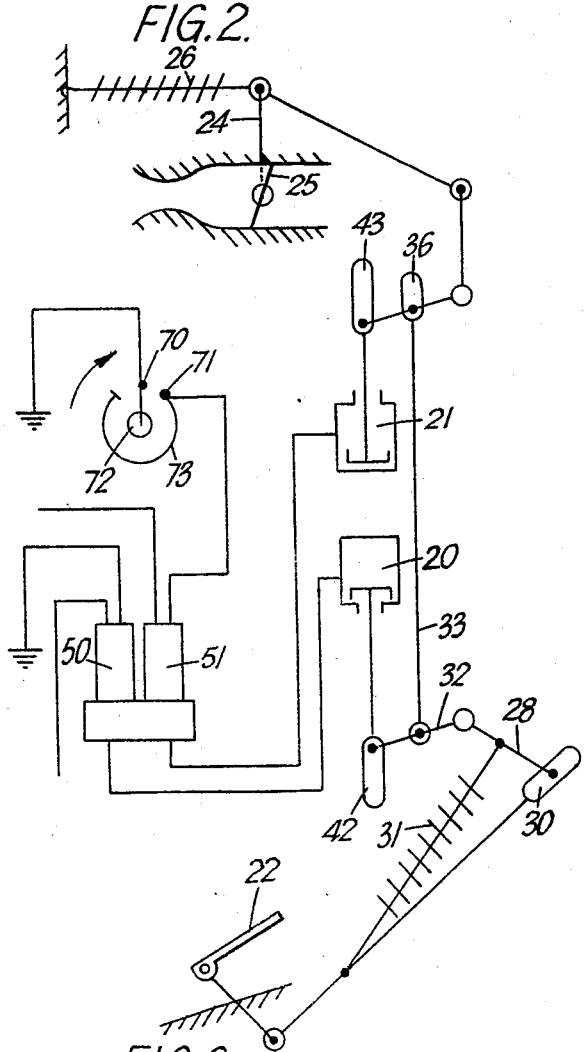
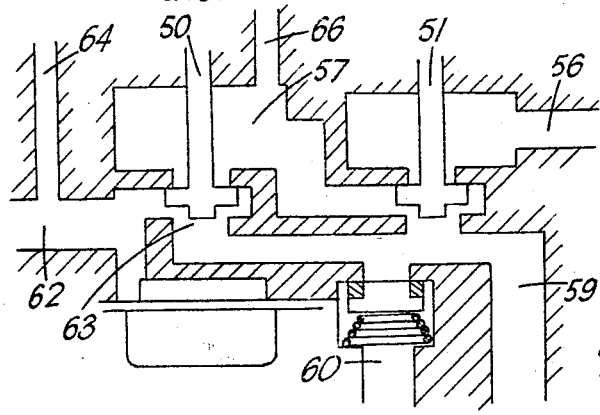

Feb. 2, 1960     R. H. BROWN     2,923,387
CLUTCH AND THROTTLE CONTROL MECHANISMS
Filed July 29, 1955     6 Sheets-Sheet 3

INVENTOR
R. H. BROWN

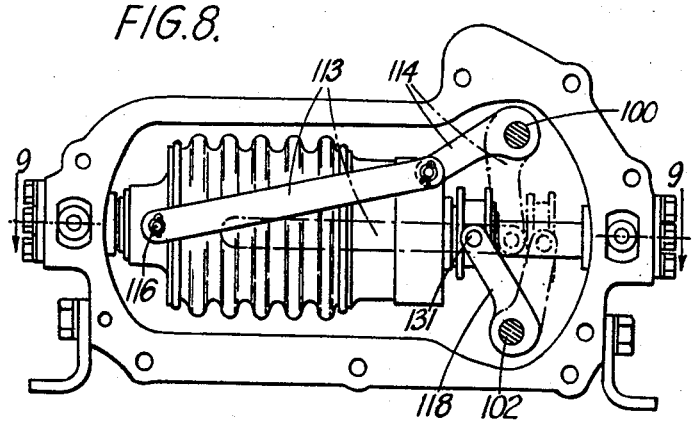
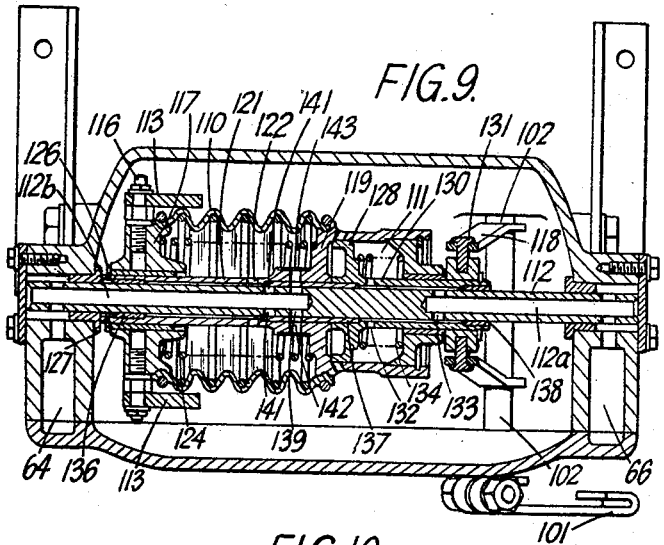
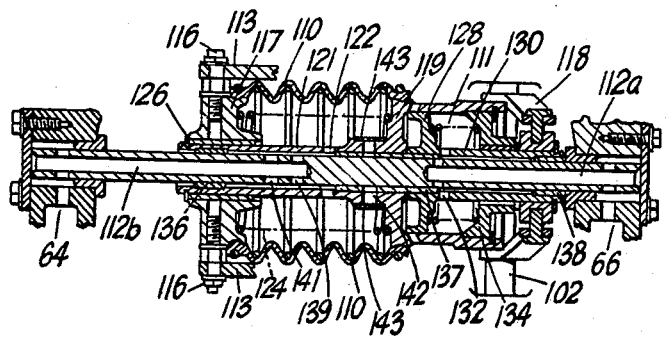

Feb. 2, 1960 R. H. BROWN 2,923,387
CLUTCH AND THROTTLE CONTROL MECHANISMS
Filed July 29, 1955 6 Sheets-Sheet 6

United States Patent Office 2,923,387
Patented Feb. 2, 1960

2,923,387

CLUTCH AND THROTTLE CONTROL MECHANISMS

Richard Harmer Brown, Coventry, England, assignor to Humber Limited, Coventry, England, a British company Application July 29, 1955, Serial No. 525,259

Claims priority, application Great Britain July 30, 1954

11 Claims. (Cl. 192—.084)

The invention relates to mechanism for controlling the clutch and throttle of a motor vehicle and of the kind having automatic means for closing the throttle—overruling control by the driver—when the clutch is disengaged and further automatic means responsive to the condition in which the driving member of the clutch is rotating slower than the driven clutch member, to open the throttle—overruling both control by the driver and by the aforesaid throttle closing means—and responsive to the condition in which the driving member over-runs the driven member to restore control of the throttle to the driver or to the throttle closing means, said mechanism also including means whereby, if the driven member is rotating faster than the driving member, re-engagement of the clutch is delayed after release of a control for the disengagement of the clutch, until the throttle has been opened and the driving member slightly over-runs the driven member.

The expression "throttle" is used herein to include not only the valve commonly employed to control the speed of an engine by varying the amount of combustible mixture supplied thereto but also other means for varying the engine speed and "opening" and "closing" are used to include the operation of such other means to increase or decrease engine speed respectively.

In mechanisms of the above kind as at present proposed, the throttle opening means are also subject to control by the control for the disengagement of the clutch and are inoperative until the disengaging control has been released to permit re-engagement of the clutch as aforesaid. With this arrangement the delay aforesaid in the re-engagement of the clutch may be undesirably prolonged due to the time required to open the throttle and accelerate the engine and it is an object of the present invention to shorten the delay.

The invention provides clutch and throttle control mechanism of the kind described above, in which the throttle opening means are operative to open the throttle as aforesaid at any time during the period of clutch disengagement, when the driven member is rotating faster than the driving member.

With the mechanism according to the invention there will be alternating operation of the throttle closing and opening means during the whole period of clutch disengagement whereby approximate synchronisation of the clutch members will be maintained during that period.

Some specific examples of how the invention may be carried into effect will now be described with reference to the accompanying drawings in which:

Figures 1 to 3 are diagrams illustrating three sets of conditions in the operation of the first example;

Figures 4 to 7 are diagrams illustrating four sets of conditions of valves employed in each example;

Figure 8 is a front view, with a cover and other parts removed, of a mechanism which may be used to replace parts of the construction shown in Figures 1 to 3;

Figure 9 is a section on the line 9—9 in Figure 8 with the cover in place and showing the suction responsive devices in the throttle closed, suction off, condition;

Figure 10 is a section, corresponding to Figure 9, showing the suction responsive devices in the throttle open, suction off condition.

Figure 11:
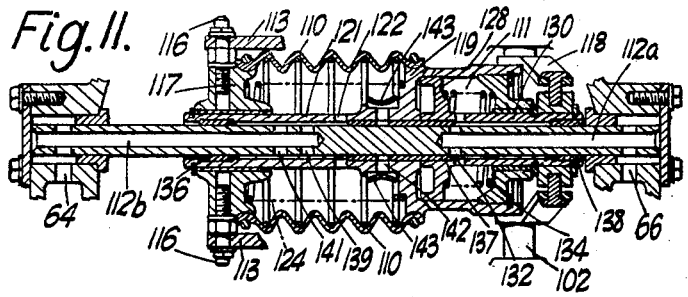
Figure 11 is a view corresponding to Figure 10 but showing the first effect of admitting suction to the throttle opening device.
Figure 12:
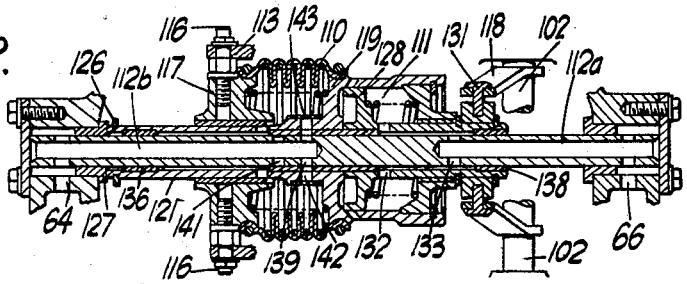
Figure 12 is a section, also corresponding to Figure 9, showing the throttle closing device in the suction on condition, the throttle opening device being shown in the suction off condition.
Figure 13:
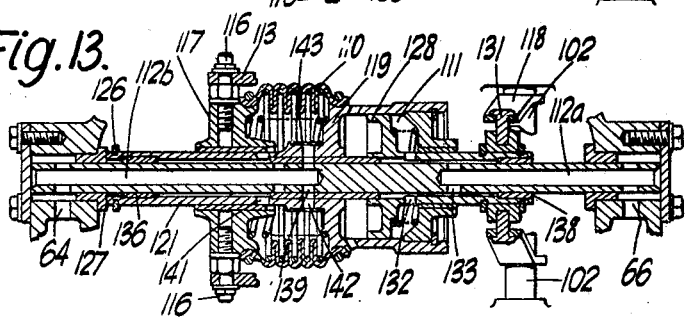
Figure 14:
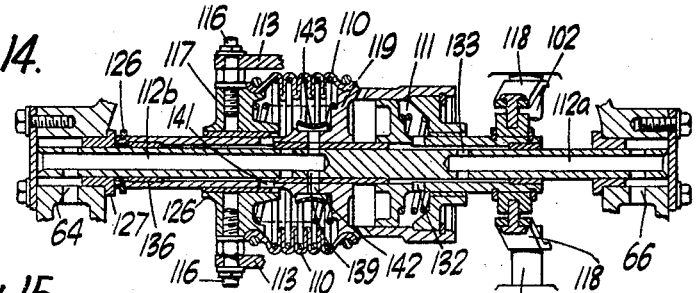
Figure 15:
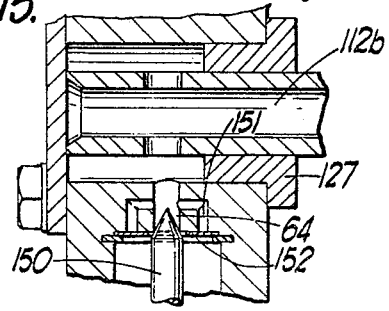

Figure 13 corresponds to Figure 12 but shows the throttle opening device in the suction on condition, Figure 14 corresponds to Figure 13 but shows the effect of cutting off the suction and beginning to admit air, and Figure 15 is a section showing somewhat diagrammatically, a modification to the construction of Figures 9 to 14.

In the first example (Figures 1–7) suction derived from the engine inlet manifold and stored in a reservoir (not shown) is employed to provide power for disengaging the clutch, which is of the centrifugal type, and electrical means are employed for controlling the application of the power. There is a suction operated diaphragm (not shown) for disengaging the clutch and two suction operated devices which are shown diagrammatically as pistons and cylinders but may be bellows or diaphragms and chambers or the like, for closing and opening the throttle respectively, these devices being shown diagrammatically at 20, 21.

Figure 1:
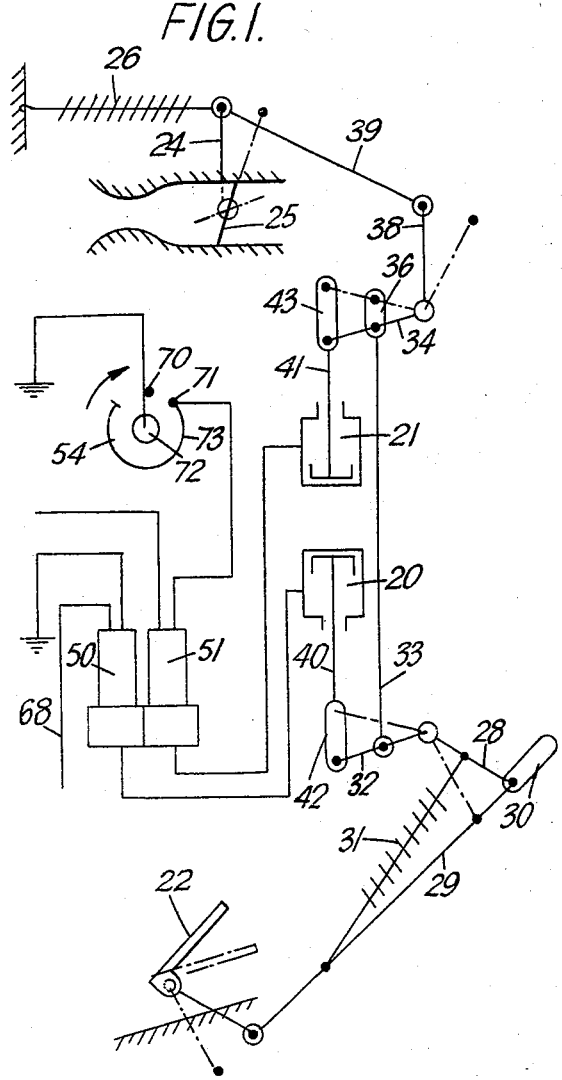

For the normal operation of the throttle by the driver there is a pedal 22 which is connected through a system of bell-crank levers and links to an arm 24 on the spindle of the usual form of butterfly throttle valve 25. A spring 26 also operating on the arm serves as means for closing the valve. The pedal is connected to one arm 28 of a bell-crank lever (later referred to as the closing lever) through a link 29 and a lost motion coupling 30 and there is a spring 31 connecting the arm and the link which operates in opposition to the closing spring 26 aforesaid and with greater effect whereby the coupling is normally held (as shown in Figure 1) at the end of the lost motion such that depression of the pedal will operate directly to open the throttle valve. The other arm 32 of the closing lever is connected by a link 33 to one arm 34 of a second bell-crank lever (later referred to as the opening lever), the connection being through a second lost motion device 36 which is normally held by the closing spring 26 at the end of the lost motion such that depression of the pedal will operate directly to open the throttle valve (also shown in Figure 1). The other arm 38 of the opening lever is connected by a link 39 to the aforesaid arm on the throttle valve spindle. The arrangement accordingly is that the lever and link mechanism normally provides an inextensible operating connection between the pedal 22 and throttle valve 25, but it is possible by rocking the closing lever 28, 32 to close the throttle, the movement being permitted by the lost motion connection 30 (see Figure 2), without change in pedal position. It is also possible, by rocking the opening lever 34, 38, to open the throttle, this movement being permitted, by the lost motion connection 36 between the lever and the link from the closing lever, to take place without change in the position of the closing lever 28, 32 or the pedal (see Figure 3).

The throttle closing and opening pistons 20, 21 are connected by operating rods 40, 41, and further lost motion devices 42, 43 to the closing and opening levers respectively. In each case the lost motion permits the normal operation of the pedal to take place when the piston is under atmospheric pressure, this being the condition shown in Figure 1. When suction is admitted to the closing cylinder 20, the diaphragm operates as shown in Figure 2, to take-up the lost motion in the device 42 and to move the closing bell-crank 28, 32 to the closed position of the throttle valve—if it is not already there. When suction is admitted to the cylinder of the opening device 21, the piston operates in similar manner to open the throttle (see Figure 3). In each case these movements take place without movement of the pedal on account of the lost motion permitted by device 60 in the case of the closing of the throttle and on account of the lost motion permitted by device 36 in the case of the opening of the throttle. In the latter case the lost motion also permits the return to take place without effect on the closing piston.

The admission of suction to the clutch disengaging diaphragm and to the throttle closing and opening devices is controlled by two solenoid operated valves 50, 51. The solenoid of valve 50 is energised under the control of a manually operated switch (not shown) and the other under the control of a synchronising switch 54 as later described. Each valve has two positions (see Figures 4 to 7). In one position (shown in Figure 4) the valve 51, which is controlled by the synchronising switch, admits atmospheric air from an inlet 56 an to intermediate chamber 57 and shuts off from the chamber 56 suction from a passageway 58 connected to the reservoir via pipe 59 to the inlet manifold via pipe 60. In the other position (shown in Figures 6 and 7) it shuts off the air inlet 56 and opens the chamber to suction passageway 58. The valve 50 controlled by the manual switch, in one position (shown in figure), opens the intermediate chamber 57 to a connection 62 to the clutch disengaging diaphragm and shuts off a suction opening 63 to the connection and in the other position (shown in Figures 5 and 6) opens the suction opening 63 to the connection 62 and shuts off the intermediate chamber 57 therefrom.

Figure 7:
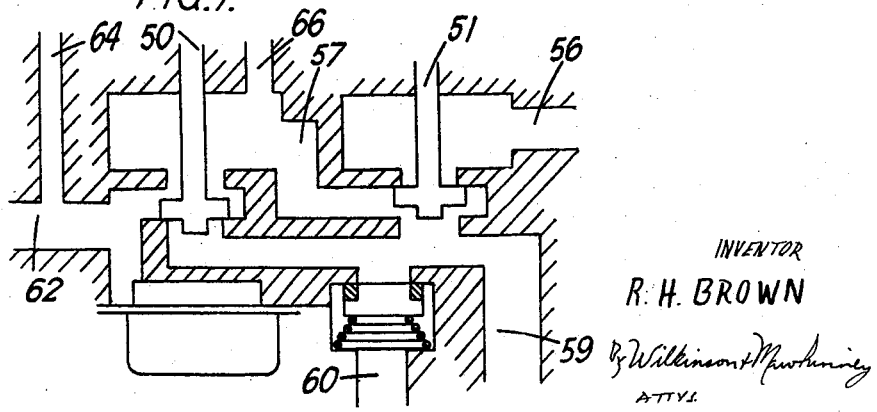

There is a lead 64 from the connection 62 to the clutch diaphragm, to the throttle closing device 20 so that the latter operates all the time the clutch is disengaged. There is also a lead 66 from the intermediate chamber 57 to the throttle opening device 21 whereby the latter operates when the chamber 57 is open to suction (as shown in Figures 6 and 7) through the synchronising-switch-controlled valve 51 (i.e. when the solenoid of this valve is energised).

The manually operable switch (constructed for example as described in British patent specification No. 619,223) associated with a gear change lever is closed during the period of a gear change. The switch is connected in the lead 68. The synchronising switch 54 known per se is associated with the clutch and is closed by engagement of contacts 70, 71 when the clutch driven member 72 over-runs, in the direction of the arrow, the driving member 73 but is open as shown when the driven member is rotating slower than the driving member.

Figure 4:
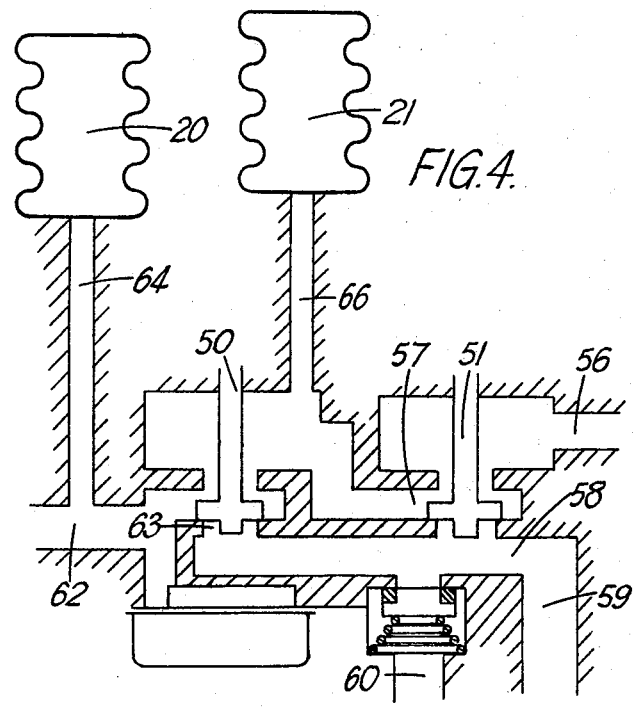
Figure 5:
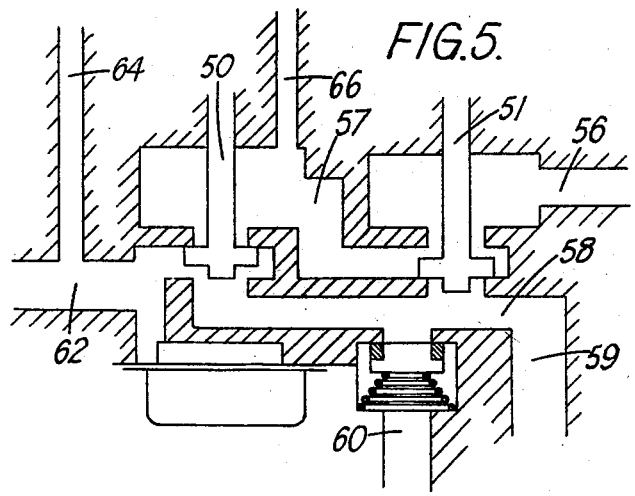

During normal running both switches are open and both valves are positioned (as shown in Figure 4) to shut off suction from the clutch diaphragm, which is open to atmosphere through the two valves in series and the intermediate chamber 57 and air inlet 56. If the manual switch is now closed by operation of the gear lever to effect a gear change, the valve 50 controlled thereby moves to admit suction to the clutch diaphragm and throttle closing devices, the intermediate chamber and opening cylinder remaining open to atmosphere, that being the condition shown in Figure 5. The throttle accordingly closes and the engine and the clutch driving member 73 tend to slow down. If the driving member reaches a speed which is less than the driven member (e.g. as the result of a synchro-mesh gear change or an unduly prolonged period of throttle closing), the synchronising switch closes (i.e. the contacts 70 and 71 come together as shown in Figure 6) and the valve 51 controlled thereby opens (Figure 6) to admit suction to the intermediate chamber 57 and thence through 66 to the throttle opening device 21 so that the throttle opens and the speed of the engine and clutch driving member 73 increases until they over-run the driven member 72 when the switch opens (i.e. contacts 70 and 71 separate) and the throttle closes. Release of the manually operable switch permits the valve 50 controlled thereby to close its suction connection to the clutch diaphragm (Figure 7) but the suction is maintained from the intermediate chamber unless and until the synchronising switch opens, when approximate synchronisation has been reached. The conditions shown in Figure 4 are thus restored and the clutch engages.

Figure 3:
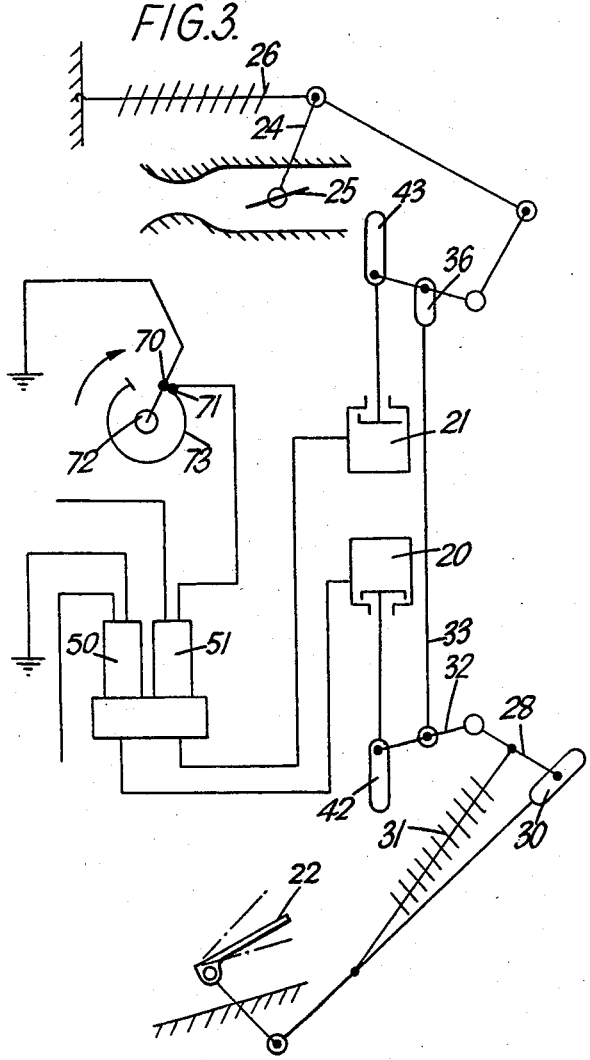

Figures 8 to 14 show the pirncipal features of a practical mechanism which, in a further example, replaces the linkage between the pedal 22 and the throttle 25, including the throttle opening and closing devices 21 and 20 and the lost motion devices, shown in Figures 1 to 3. In this mechanism the pedal 22 is connected by links or cable to an arm (not shown) on a spindle 100 and an arm 101 on a spindle 102 is connected by further links or cable to the arm 24 on the butterfly valve spindle. The closing spring 26 is omitted and replaced by a spring (not shown) acting on the arm on spindle 100.

The mechanism comprises a unit consisting of a throttle-closing bellows device 110 (equivalent to the above described throttle closing device 20) and a piston and cylinder throttle-opening device 111 (equivalent to the throttle opening device 21), the unit being slidable along a tube 112. One end of the unit is connected by a link 113 to arms 114 on the spindle 100 which is connected, as above described, for rotation by a pedal 22. The arms 114 are rotatable from the full-line throttle-closed position in which the arms 114 and links 113 are in substantial alignment to the chain-line throttle-open position. During such rotation the unit is slid to the right, as viewed, from the position shown in Figures 8 and 9 to the position shown in Figure 10. The arrangement ensures that decreasing increments or movement of the arms 114 produce equal increments in the sliding movement of the unit. It is not essential that the arms and links are initially in substantially full alignment. The links 113 are pivotally connected by pins 116 to the end 117 of the bellows 110. At the other end the unit is connected to an arm 118 on the spindle 102 carrying arm 101. In Figure 8 the full line position of arm 118 corresponds to the throttle-closed position and the chain line position of the arm to the throttle open position. The arrangement accordingly is that movement of the unit from the Figure 9 position to the Figure 10 position, effected solely by depression of the accelerator pedal, opens the throttle valve. The above-mentioned return spring effects the return movements.

The opposite end 119 of the bellows is extended in one direction to form the cylinder of the device 111 and in the other direction to constitute a sleeve 121 fitting with clearance over the tube 112. A spring 124 urges the two parts 117 and 119 of the bellows apart and is held pre-loaded by engagement of the part 117 with a stop 126 on the sleeve.

Surrounding the tube 112 there is a fixed abutment 127. Within the cylinder of the device 111 there is a piston 128 which has a sleeve 130 fitting, with clearance, around tube 112. The sleeve 130 carries the trunnion 131 with which the arm 118 is engaged. A port 132 in the sleeve 130 opens into the clearance space between the sleeve and the tube and there is a port 133 which leads into the clearance space from the interior 112a of the tube. A spring 134 urges the piston to the throttle closed position.

The sleeves 121 and 130 have liners 136, 137 and 138 at each end of the slidable unit and centrally thereof, these liners being a substantially suction-tight sliding fit on the tube 112. Ports 140 lead between the clearance space within sleeve 121 and the inside of the bellows and there are ports 141 leading through the wall of the tube.

The sleeve 121 and the liner 137 are formed with ports 142 which, when the sleeve is in the throttle closed position as shown in Figure 9 register with ports 139 in the wall of the tube 112 leading to the interior 112b thereof. The ports 142 lead into the interior of the bellows and are covered by a resilient band 143 which constitutes a non-return valve permitting flow only into the bellows.

The end 112a of tube 112 is connected to lead 64 (see also Figures 4–7) and the end 112b of the tube is connected to lead 66.

The operation of the mechanism is as follows. During normal driving, movements of the accelerator pedal are transmitted from the link 113 and pins 116 to the end 117 of the bellows and through the unit 110 and 111 sliding bodily on the tube 112 to arm 118 and thence to the throttle. Figure 9 shows the position of the unit when the pedal is up and Figure 10 the position when the pedal is fully depressed and the throttle open. If, when the pedal is fully, or partly, depressed the manually operable switch aforesaid is operated at the beginning of a gear change, valve 50 admits suction to the clutch diaphragm through connection 62 and also through lead 64 to the end 112a of the tube and thence through ports 140 and 141 and the clearance inside sleeve 121 to the bellows 110. This causes the bellows to collapse and the end part 119 thereof to move to the left until the sleeve 121 abuts against the abutment 127. Figure 11 shows the beginning of this operation and Figure 12 shows the end. When this position is reached the ports 141 are closed by the liner 137 and suction is cut off from the bellows. The effect of the collapse is to draw the cylinder device 111 to the left so as to effect closing of the throttle by operation of arm 118. If now the synchronising switch 54 closes, suction is admitted through connection 66, tube part 112a, ports 133, the clearance inside sleeve 130 and ports 132 into the cylinder of the throttle opening device 111. This causes the piston to move to the right to move arm 118 to open the throttle to a pre-set "boost" position. Figure 13 shows the end of this movement. When, at the end of the gear changing operation, the manual switch is opened air at atmospheric pressure is admitted to the end 112b of the tube (also to the end 112a of the tube), the air enters the bellows through ports 139, 142 and valve 143 thereby permitting the spring 124 to expand the bellows to the initial length and so to return the throttle to the setting determined by the accelerator pedal. During the latter part of the expansion air is admitted to the bellows through port 141. Figure 14 shows the beginning of this operation. When the operation has been completed the parts are again in the position shown in Figure 10.

It has been found sometimes to be desirable that the collapse of the bellows 110 should be effected rapidly after the opening of the suction valve but that the expansion when the valve is opened to atmosphere should be considerably slower. This result may be achieved, as shown in Figure 15, by providing an adjustable constriction (shown as a needle valve 150) in the connection 64 and a by-pass 151 around the constriction with a non-return valve 152 preventing flow through the by-pass in the direction into the bellows. With this arrangement exhaustion of the bellows is effected rapidly through the by-pass whereas air flowing into the bellows to permit expansion must pass through the constriction.

It is an advantage of the construction according to the above examples that, in a gear change operation, synchronisation of the clutch members begins to take place immediately the synchronising means of the gear box operate and is not delayed until the gear changing operation has been completed by engagement of the gear. In practice synchronisation of the clutch members may be achieved by the time the gear change is completed or very shortly thereafter. It is a further advantage that the clutch is not held out of engagement when the gear lever is released in the neutral position.

I claim:

1. In a motor vehicle having a clutch embodying engageable and disengageable driving and driven members and a throttle for controlling the operation of the engine, throttle control mechanism comprising a driver's control for the throttle, throttle closing means responsive to disengagement of the clutch automatically to close the throttle, over-ruling the driver's control, throttle opening means responsive during disengagement of the clutch to the condition that the driving member of the clutch is rotating slower than the driven member automatically to open the throttle over-ruling both the throttle closing means and the driver's control and also responsive to the condition in which the driving member over-runs the driven member to restore the control of the throttle to the throttle closing means and, subject to the operation of the said throttle closing means, to the driver's control and means for preventing re-engagement of the clutch if the driving clutch member is rotating slower than the driven member.

2. Mechanism as claimed in claim 1 in which the throttle opening means comprise a suction operated throttle opening device, electrically operated valve means controlling application of suction to the opening device and electric switch means responsive to the condition that the clutch driving member is rotating slower than the driven member for effecting operation of the valve means to apply suction to the opening device.

3. Mechanism as claimed in claim 1 in which the throttle closing means include a suction operated throttle closing device and electrically operated valve means for controlling the application of suction to the closing device.

4. Mechanism as claimed in claim 3 and including suction operated means operative to effect disengagement of the clutch, electrically operated valve means for controlling application of suction to the clutch disengaging means and manually operable switch means for controlling the valve means to effect the application of suction to disengage the clutch and also simultaneously to control the application of suction to the throttle closing device.

5. Mechanism as claimed in claim 1 and including suction operated means operative to effect disengagement of the clutch, electrically operated valve means for controlling application of suction to the clutch disengaging means and manually operable switch means for controlling the valve means to effect the application of suction to disengage the clutch.

6. Mechanism as claimed in claim 5 and including a gear change lever in which the manually operable switch is incorporated, the switch being operative to cause application of suction to maintain disengagement of the clutch during a gear changing operation.

7. Mechanism as claimed in claim 1 in which the throttle opening means comprise a suction operated throttle opening device and the throttle closing means comprise a suction operated throttle closing device, said mechanism having valve means for controlling the application of suction to the two devices and said valve means comprising two movable valve members each having two inlet ports leading to an outlet common to the two ports and each member being movable to two positions in which is closes respectively its two inlet ports, suction connections to one inlet port of each valve member, a connection from the outlet of one valve member (later referred to as the throttle opening valve) to the other inlet port of the second valve and a lead from this connection to the throttle opening device, an air connection to the other inlet port of the throttle opening valve, and a connection from the outlet from the second valve to the throttle closing device whereby the throttle opening control valve is operative to control the application of air and of suction to the throttle opening device and the two valves in combination are operative to control the application of air and suction to the throttle closing device.

8. Mechanism as claimed in claim 7 and including a connection from the outlet from the second valve for coupling to a suction operated clutch disengaging device whereby the two valves in combination control the application of air and suction to the clutch disengaging means at the same time as to the throttle closing means.

9. Mechanism as claimed in claim 1 having suction operated devices for opening and closing the throttle and including an accelerator pedal, and mechanical connections between the pedal and the throttle for effecting opening thereof as the pedal is depressed, said connections including, as a movable link therein, a two-part device of which one part is extensible and the other contractible by application of suction thereto, one of the parts constituting the throttle opening device and the other the throttle closing device.

10. Mechanism as claimed in claim 1 having suction operated devices for opening and closing the throttle with lost motion attachments to the throttle and including an accelerator pedal and mechanical connections between the accelerator pedal and the throttle for effecting opening thereof as the pedal is depressed, said connections including therein two successive lost motion devices, in which the throttle opening and closing devices operate through said first mentioned lost motion devices on said connections to effect opening and closing of the throttle, said opening device, when operated, taking up at least a part of the lost motion of one of the lost motion devices in the connections between the pedal and throttle, and the closing device, when operated, taking up at least a part of the lost motion of the other of the lost motion devices in the connections, whereby the opening and closing devices may each operate independently on the throttle without change in the position of the pedal.

11. Mechanism as claimed in claim 10 in which the throttle closing device operates on the connections at a position where it takes up the motion of the first lost motion device in the connections and the throttle opening device operates on the connections at a position where it takes up the motion of the second lost motion device.

References Cited in the file of this patent
UNITED STATES PATENTS

| | | |
|---|---|---|
| 2,034,263 | Maybach | Mar. 17, 1936 |